US012624201B2

(12) United States Patent
Duan et al.

(10) Patent No.: US 12,624,201 B2
(45) Date of Patent: May 12, 2026

(54) BINDER COMPOSITION, SECONDARY BATTERY, BATTERY MODULE, BATTERY PACK AND POWER CONSUMING DEVICE

(71) Applicant: CONTEMPORARY AMPEREX TECHNOLOGY (HONG KONG) LIMITED, Hong Kong (CN)

(72) Inventors: Lianwei Duan, Ningde (CN); Huihui Liu, Ningde (CN); Cheng Li, Ningde (CN); Wei Feng, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 190 days.

(21) Appl. No.: 18/515,290

(22) Filed: Nov. 21, 2023

(65) Prior Publication Data

US 2024/0124699 A1 Apr. 18, 2024

Related U.S. Application Data

(63) Continuation of application No. PCT/CN2022/096409, filed on May 31, 2022.

(51) Int. Cl.
*C08L 27/16* (2006.01)
*C08F 226/10* (2006.01)
(Continued)

(52) U.S. Cl.
CPC ............... *C08L 27/16* (2013.01); *C08L 33/08* (2013.01); *H01M 4/5825* (2013.01); (Continued)

(58) Field of Classification Search
None
See application file for complete search history.

(56) References Cited

U.S. PATENT DOCUMENTS

2013/0017429 A1* 1/2013 Ha ...................... H01M 50/446 429/144
2015/0050555 A1* 2/2015 Fukumine ........... H01M 10/052 429/217

(Continued)

FOREIGN PATENT DOCUMENTS

CN 104396060 A 3/2015
CN 104904042 A 9/2015

(Continued)

OTHER PUBLICATIONS

International Search Report received in the corresponding International Application PCT/CN2022/096409, mailed Feb. 20, 2023.

(Continued)

*Primary Examiner* — Yoshitoshi Takeuchi
(74) *Attorney, Agent, or Firm* — K&L Gates LLP

(57) ABSTRACT

Provided are a binder composition, an electrode, a battery and a power consuming device. The binder composition comprises a fluoropolymer A and a copolymer B, wherein the copolymer B comprises a structural unit derived from a monomer containing a cyano group and a structural unit derived from a monomer containing an ester group. The binder of the present application has a strong bonding force, and the cycling performance of the secondary battery comprising same is excellent.

17 Claims, 3 Drawing Sheets

(51) Int. Cl.

| | |
|---|---|
| ***C08L 33/08*** | (2006.01) |
| ***C08L 33/10*** | (2006.01) |
| ***C08L 33/12*** | (2006.01) |
| ***H01M 4/58*** | (2010.01) |
| ***H01M 4/62*** | (2006.01) |
| *H01M 4/02* | (2006.01) |

(52) U.S. Cl.
CPC ........... *H01M 4/623* (2013.01); *H01M 4/625* (2013.01); *H01M 2004/028* (2013.01)

(56) References Cited

U.S. PATENT DOCUMENTS

| | | | | |
|---|---|---|---|---|
| 2015/0357648 | A1* | 12/2015 | Sugimoto | H01M 4/622 429/217 |
| 2016/0126551 | A1* | 5/2016 | Sasaki | H01M 10/0525 525/200 |
| 2019/0190006 | A1* | 6/2019 | Wang | H01M 4/623 |
| 2020/0343555 | A1* | 10/2020 | Kuo | H01M 4/587 |
| 2020/0343594 | A1* | 10/2020 | Kuo | H01G 11/56 |
| 2021/0036289 | A1* | 2/2021 | Kim | H01M 50/461 |
| 2021/0057698 | A1* | 2/2021 | Sung | H01M 50/454 |
| 2023/0068865 | A1* | 3/2023 | Pan | H01M 10/0525 |
| 2023/0420680 | A1* | 12/2023 | Duan | H01M 4/136 |
| 2024/0124699 | A1* | 4/2024 | Duan | C08L 33/08 |

FOREIGN PATENT DOCUMENTS

| | | | |
|---|---|---|---|
| EP | 2822067 | A1 | 1/2015 |
| EP | 2908364 | A1 | 8/2015 |
| JP | 2003317722 | A | 11/2003 |
| JP | 2007128871 | A | 5/2007 |
| JP | 2011076916 | A | 4/2011 |
| JP | 2015149177 | A | 8/2015 |
| KR | 1020150114463 | A | 10/2015 |
| WO | 2014119790 | A1 | 8/2014 |

OTHER PUBLICATIONS

Written Opinion received in the corresponding International Application PCT/CN2022/096409, mailed Feb. 20, 2023.
The extended European search report received in the corresponding European Application 22927580.5, mailed on Jun. 3, 2024.
The office action issued in Japanese corresponding application 2023-550047, mailed on Nov. 12, 2024.
Request for the Submission of an Opinion received in the counterpart Korean application 10-2023-7028193, mailed on Jun. 17, 2025.

* cited by examiner

BINDER COMPOSITION, SECONDARY BATTERY, BATTERY MODULE, BATTERY PACK AND POWER CONSUMING DEVICE

CROSS REFERENCE TO RELATED MATTER

This application is a continuation of international application PCT/CN2022/096409, filed May 31, 2022 and entitled "BINDER COMPOSITION, SECONDARY BATTERY, BATTERY MODULE, BATTERY PACK AND POWER CONSUMING DEVICE", the entire content of which is hereby incorporated by reference in its entirety.

TECHNICAL FIELD

The present application relates to the technical field of lithium batteries, and in particular to a binder composition, a secondary battery, a battery module, a battery pack and a power consuming device.

BACKGROUND ART

In recent years, lithium ion batteries have been widely used in energy storage power systems such as hydroelectric, thermal, wind and solar power plants, as well as electric tools, electric bicycles, electric motorcycles, electric vehicles, military equipment, aerospace and other fields. With the popularity of lithium ion battery applications, there are higher requirements on their performance and cost.

Binders are materials that are commonly used in lithium ion batteries, and are in great demand in electrode plates, separators, and packaging and the like of batteries. However, the existing binder has high cost and poor bonding performance, thereby increasing the cost of the battery and reducing the cycling performance of the battery. Therefore, the existing binder still needs to be improved.

SUMMARY OF THE INVENTION

The present application has been made in view of the above problems, and an objective thereof is to provide a binder composition which can reduce the cost of the binder and has excellent bonding properties.

A first aspect of the present application provides a binder composition, which comprises a fluoropolymer A and a copolymer B, wherein the copolymer B comprises a structural unit derived from a monomer containing a cyano group and a structural unit derived from a monomer containing an ester group.

Thus, in the present application, the fluoropolymer A and the copolymer B comprising a structural unit derived from a monomer containing a cyano group and a structural unit derived from a monomer containing an ester group are used together as a binder; compared to the fluoropolymer A or the copolymer B alone used as a binder, the bonding performance of the binder and the cycling performance of the battery can be further improved.

In any embodiment, the weight average molecular weight of the fluoropolymer A is 600,000-900,000, and the weight average molecular weight of the copolymer B is 400,000-700,000. The control of the weight average molecular weight of the polymer can balance the bonding performance and processability of the binder. If the weight average molecular weight of the polymer is too low, the brittleness will be too high, such that the bonding force of the binder is insufficient. If the weight average molecular weight of the polymer is too high, it will be difficult to disperse an electrode active material. Moreover, the reasonable combination of polymers with different molecular weights can improve the dispersion of the electrode active material, thereby improving the performance of the battery.

In any embodiment, the mass ratio the fluoropolymer A to the copolymer B is 1:4-4:1. A reasonable combination of the fluoropolymer A and the copolymer B in a certain mass range can further improve the bonding performance of the binder and the cycling performance of the battery.

In any embodiment, the fluoropolymer A is selected from one or more of polyvinylidene fluoride, and the copolymers thereof with tetrafluoroethylene, hexafluoropropylene, and trichloroethylene.

In any embodiment, the monomer containing a cyano group is selected from one or more of acrylonitrile, methacrylonitrile, halogenated acrylonitrile, and methoxyacrylonitrile.

In any embodiment, the monomer containing an ester group is selected from one or more of methyl acrylate, ethyl acrylate, propyl acrylate, butyl acrylate, isoamyl acrylate, isooctyl acrylate, methyl methacrylate, ethyl methacrylate, hydroxyethyl acrylate, and hydroxypropyl acrylate. Compared with fluorine-containing monomers, the above monomer containing a cyano group and monomer containing an ester group have low cost, are not subjected to policy restrictions, can be mass-produced, and can greatly reduce the cost of the binder.

In any embodiment, the mass ratio of the structural unit derived from the monomer containing a cyano group to the structural unit derived from the monomer containing an ester group in the copolymer B is 8:1-12:1. The monomer containing a cyano group can improve the mechanical strength and bonding performance of the copolymer B, which can further improve the cycling performance of the battery. A small amount of the monomer containing an ester group can improve the flexibility of the copolymer B and avoid the brittle fracture of the electrode plate; in addition, the ester group has a certain ability to absorb and preserve the electrolyte solution, which can solve the problem of poor ionic conductivity of the fluoropolymer A.

In any embodiment, the copolymer B further comprises a structural unit derived from a monomer containing a group shown in formula I, Formula I

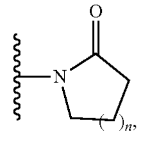

in which, n is selected from 0, 1, 2, or 3.

The electronegativity of the oxygen element in the group shown in formula I is greater than that of the nitrogen element in the cyano group; compared with the cyano group in the copolymer B, it is easier to form hydrogen bonds between the electrode active material and the conductive agent and the bond energy is higher, which can greatly improve the dispersibility of the slurry, make the solid substances in the slurry less prone to precipitate and increase the solid content of the slurry. At the same time, the addition of the group shown in formula I can further improve the bonding force of the battery electrode plate and the cycling performance of the battery.

In any embodiment, the monomer containing a group shown in formula I is selected from one or more of N-vinylpyrrolidone and N-allyl-2-pyrrolidone. The above monomers have low cost and good stability, and are easy to process and synthesize.

In any embodiment, the mass content of the structural unit derived from the monomer containing a group shown in formula I is 0.1%-2%, based on the total mass of the copolymer B. The dispersion of the copolymer B can be improved by containing a proper amount of a group shown in formula I, such that the prepared slurry is not easy to precipitate, which is helpful to increase the solid content of the slurry and further improve the load of the electrode.

A third aspect of the present application provides a secondary battery, including an electrode assembly and an electrolyte solution, wherein the electrode assembly includes a positive electrode plate, a separator, and a negative electrode plate, and the positive electrode plate includes a positive active material and the binder of the first or second aspect of the present application. The battery has better cycling performance.

In any embodiment, the positive electrode active material is a lithium-containing transition metal oxide, which is optionally lithium iron phosphate or doped and modified materials thereof, or at least one of conductive carbon-coated modified materials, conductive metal-coated modified materials, or conductive polymer-coated modified materials thereof.

In a fourth aspect, the present application provides a battery module, comprising a secondary battery of the third aspect of the present application.

In a fifth aspect, the present application provides a battery pack, comprising a battery module of the fourth aspect of the present application.

In a sixth aspect, the present application provides a power consuming device, comprising at least one of a secondary battery of the third aspect of the present application, a battery module of the fourth aspect of the present application, and a battery pack of the fifth aspect of the present application.

The battery module of the fourth aspect and the battery pack of the fifth aspect of the present application include the secondary battery of the third aspect, so they have the same advantages as the secondary battery.

LIST OF REFERENCE NUMERALS

Figure 1:
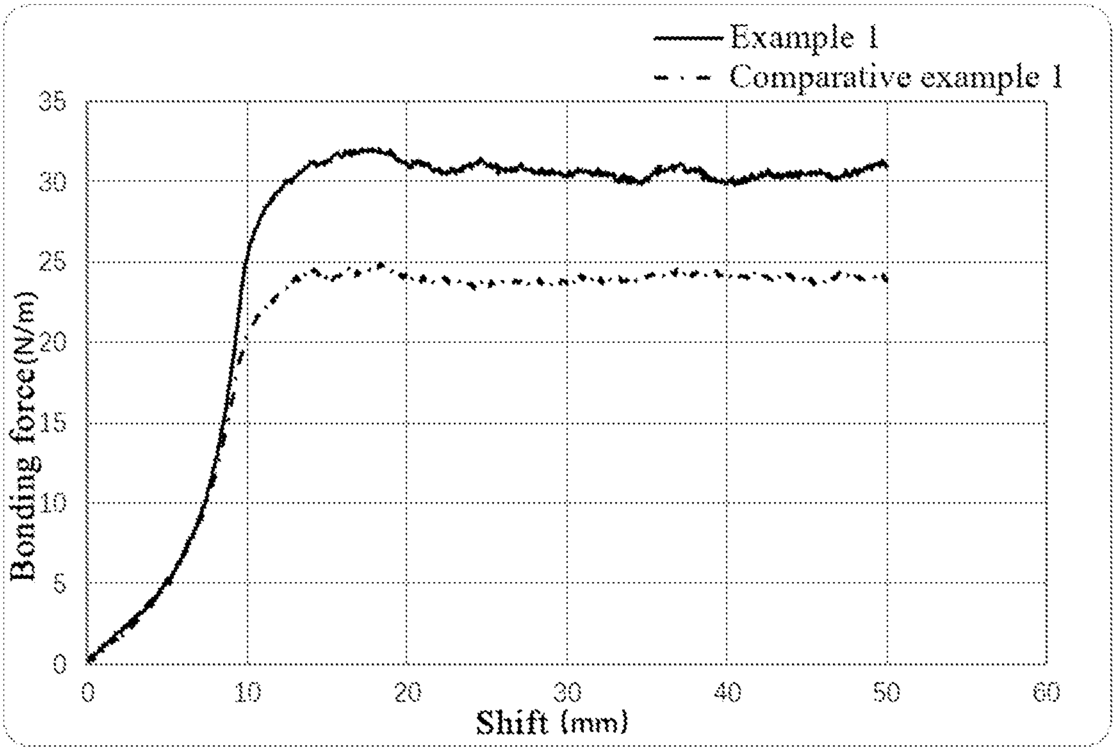
FIG. 1 is a graph of the bonding performance test of the binder prepared in example 1 and comparative example 1.

1—battery pack; 2—upper box body; 3—lower box body; 4—battery module; 5—secondary battery; 51—housing; 52—electrode assembly; 53—top cover assembly.

DETAILED DESCRIPTION OF EMBODIMENTS

Hereinafter, the embodiments of the binder and a preparation method therefor, the electrode, the battery and the power consuming device of the present application are specifically disclosed in the detailed description with reference to the accompanying drawings as appropriate. However, unnecessary detailed illustrations may be omitted in some instances. For example, there are situations where detailed description of well known items and repeated description of actually identical structures are omitted. This is to prevent the following description from being unnecessarily verbose, and facilitates understanding by those skilled in the art. Moreover, the accompanying drawings and the descriptions below are provided for enabling those skilled in the art to fully understand the present application, rather than limiting the subject matter disclosed in the claims.

The "ranges" disclosed in the present application are defined in the form of lower and upper limits. A given range is defined by selecting a lower limit and an upper limit, and the selected lower and upper limits defining the boundaries of the particular range. Ranges defined in this manner may be inclusive or exclusive, and may be arbitrarily combined, that is, any lower limit may be combined with any upper limit to form a range. For example, if the ranges 60-120 and 80-110 are listed for a particular parameter, it should be understood that the ranges 60-110 and 80-120 are also contemplated. Additionally, if minimum range values 1 and 2 are listed and maximum range values 3, 4, and 5 are listed, the following ranges are all contemplated: 1-3, 1-4, 1-5, 2-3, 2-4, and 2-5. In the present application, unless stated otherwise, the numerical range "a-b" denotes an abbreviated representation of any combination of real numbers between a and b, where both a and b are real numbers. For example, the numerical range "0-5" means that all the real numbers between "0-5" have been listed herein, and "0-5" is just an abbreviated representation of combinations of these numerical values. In addition, when a parameter is expressed as an integer ≥2, it is equivalent to disclosing that the parameter is, for example, an integer of 2, 3, 4, 5, 6, 7, 8, 9, 10, 11, 12, etc.

All the embodiments and optional embodiments of the present application can be combined with one another to form new technical solutions, unless otherwise stated.

All technical features and optional technical features of the present application can be combined with one another to form a new technical solution, unless otherwise stated.

Unless otherwise stated, all the steps of the present application may be performed sequentially or randomly, preferably sequentially. For example, the method including steps (a) and (b) indicates that the method may include steps (a) and (b) performed sequentially, and may also include steps (b) and (a) performed sequentially. For example, reference to "the method may further include step (c)" indicates that step (c) may be added to the method in any order, e.g., the method may include steps (a), (b) and (c), or steps (a), (c) and (b), or steps (c), (a) and (b), etc.

The terms "comprise" and "include" mentioned in the present application are open-ended or may also be closed-ended, unless otherwise stated. For example, "comprise" and "include" may mean that other components not listed may further be comprised or included, or only the listed components may be comprised or included.

In the present application, the term "or" is inclusive unless otherwise specified. For example, the phrase "A or B" means "A, B, or both A and B". More specifically, the condition "A or B" is satisfied by any one of the following: A is true (or present) and B is false (or not present); A is false (or not present) and B is true (or present); or both A and B are true (or present).

PVDF is a commonly used battery binder, but its cost is high and its bonding force is poor. During the cycle use of the battery, the cycling performance of the battery will be further reduced due to the weakening of the bonding force. Based on the above technical problems, the present application has developed a binder that has low cost and enables the electrode plate to have excellent bonding force, which significantly improves the cycling performance of the battery.

[Binder]

On this basis, the present application proposes a binder composition, which comprises a fluoropolymer A and a copolymer B, wherein the copolymer B comprises a structural unit derived from a monomer containing a cyano group and a structural unit derived from a monomer containing an ester group.

Herein, the term "binder composition" refers to a mixture of a chemical compound or a polymer that forms a colloidal solution or a colloidal dispersion in a dispersion medium (such as water).

In some embodiments, the dispersion medium of the binder is an aqueous solvent, such as water.

In some embodiments, the dispersion medium of the binder is an oily solvent. Examples of the oily solvent include, but are not limited to, dimethylacetamide, N,N-dimethylformamide, N-methylpyrrolidone, acetone, dimethyl carbonate, ethyl cellulose, and polycarbonate.

In some embodiments, the binder is used to fix the electrode material and/or a conductive agent in a suitable place and bind them to a conductive metal part to form an electrode. In some embodiments, the electrode does not contain any conductive agent.

In some embodiments, the binder is used as the positive electrode binder for binding the positive electrode active material and/or the conductive agent to form the positive electrode.

In some embodiments, the binder is used as the negative electrode binder for binding the negative electrode active material and/or the conductive agent to form the negative electrode.

Herein, the term "polymer" includes, on the one hand, the aggregate of macromolecules prepared by polymerization (copolymerization or homopolymerization) that are chemically homogeneous but differ in degree of polymerization, molar mass and chain length. On the other hand, the term also includes derivatives of such aggregates of macromolecules formed by polymerization, that is, compounds or mixtures that can be obtained by the reaction of functional groups in the above macromolecules, such as addition or substitution, and can be chemically homogeneous or chemically heterogeneous.

Herein, the term "fluoropolymer" refers to a polymer comprising a fluorine element.

Herein, the term "copolymer" refers to a polymer prepared by polymerizing two or more different types of monomers.

Herein, the term "cyano" refers to a —CN group.

Herein, the term "ester group" refers to a group having a structural unit with a general formula of —$COOR_9$, in which $R_9$ is selected from $C_{1-5}$ alkyl unsubstituted or substituted by a substituent. Examples of the ester group include, but are not limited to: methyl ester, ethyl ester, propyl ester, butyl ester, pentyl ester, isooctyl ester, etc.

Herein, the term "substituted" refers to being substituted by a substituent, wherein the substituent is each independently selected from: hydroxyl, mercapto, amino, cyano, nitro, aldehyde group, a halogen atom, $C_{1-6}$ alkyl, and $C_{1-6}$ alkoxy.

In some embodiments, the copolymer B is selected from one or more of acrylonitrile-methyl acrylate copolymers, acrylonitrile-2-methyl methacrylate copolymers, acrylonitrile-2-ethyl methacrylate copolymers, acrylonitrile-ethyl acrylate copolymers, acrylonitrile-butyl acrylate copolymers, acrylonitrile-isooctyl acrylate copolymers, acrylonitrile-butyl acrylate-hydroxyethyl acrylate copolymers, acrylonitrile-butyl acrylate-ethyl acrylate copolymers, acrylonitrile-isoamyl acrylate-hydroxypropyl acrylate copolymers, acrylonitrile-butyl acrylate-isooctyl acrylate-methyl methacrylate copolymers, and acrylonitrile-butyl acrylate-isooctyl acrylate-ethyl methacrylate copolymers. In some embodiments, the copolymer B is an acrylonitrile-isooctyl acrylate copolymer.

The structural unit derived from a monomer containing a cyano group can not only effectively complex with the metal on the surface of the current collector, but also with the metal elements on the electrode active material, which ensures a strong bonding force between the electrode active material and the current collector. At the same time, the structural unit derived from the monomer containing an ester group can improve the flexibility of the electrode plate and avoid the brittle fracture of the electrode plate. In addition, the cyano group and ester group on the copolymer B and the fluorine element in the fluoropolymer A generate a stronger bonding force between the electrode active material particles on the electrode plate via hydrogen bonds.

In the present application, the fluoropolymer A and the copolymer B comprising a structural unit derived from a monomer containing a cyano group and a structural unit derived from a monomer containing an ester group are used together as a binder, compared to the fluoropolymer A or the copolymer B alone used as a binder, the bonding performances of the binder between the electrode active material and the current collector, the electrode active material and the conductive agent, and the electrode active material and/or the conductive agent and the current collector are significantly improved, and the cycling performance of the battery is significantly improved.

In some embodiments, the weight average molecular weight of the fluoropolymer A is $6\times10^5$-$9\times10^5$, and the weight average molecular weight of the copolymer B is $4\times10^5$-$7\times10^5$. In some embodiments, the weight average molecular weight of the fluoropolymer A is selected from $6\times10^5$-$8\times10^5$, or $6\times10^5$-$7\times10^5$, or $7\times10^5$-$9\times10^5$, or $8\times10^5$-$9\times10^5$. In some embodiments, the weight average molecular weight of the copolymer B is selected from $4\times10^5$-$7\times10^5$, or $4\times10^5$-$6\times10^5$, or $4\times10^5$-$5\times10^5$, or $5\times10^5$-$7\times10^5$, or $6\times10^5$-$7\times10^5$.

Herein, the term "weight average molecular weight" refers to the sum of the weight fractions of molecules with different molecular weights in the polymer multiplied by their corresponding molecular weights.

The control of the weight average molecular weight of the polymer can balance the bonding performance and processability of the binder. If the weight average molecular weight of the polymer is too low, the brittleness will be too high, such that the bonding force of the binder is insufficient. If the weight average molecular weight of the polymer is too high, it will be difficult to disperse an electrode active material. Moreover, the reasonable combination of polymers with different molecular weights can improve the dispersion of the electrode active material, thereby improving the performance of the battery.

In some embodiments, the mass ratio the fluoropolymer A to the copolymer B is 1:4-4:1. In some embodiments, the mass ratio of the fluoropolymer A to the copolymer B is 1:4-3:1, or 1:4-2:1, or 1:4-1:1, or 1:2-1:4, or 1:2-4:1, or 1:1-4:1, or 2:1-4:1, or 3:1-4:1. A reasonable combination of the fluoropolymer A and the copolymer B in a certain mass range can further improve the bonding force of the electrode plate and the cycling performance of the battery.

In some embodiments, the fluoropolymer A is selected from one or more of polyvinylidene fluoride, and the copolymers thereof with tetrafluoroethylene, hexafluoropropylene, and trichloroethylene.

In some embodiments, the fluoropolymer A is polyvinylidene fluoride, which is synthesized by an emulsion method, and has a particle volume average particle size Dv50 of 5-10 μm, a crystallinity of 35-40%, and a melting point of 160-170° C.

Compared with a suspension method for the synthesis of PVDF, the polyvinylidene fluoride synthesized by the emulsion method has a large single-synthesis capacity and lower cost. An appropriate molecular weight enables the slurry comprising the binder of the present application to have both excellent suspension and dispersibility, and prevents the binder from being unevenly dispersed in the slurry due to the sedimentation or agglomeration of the binder. An appropriate particle size can effectively reduce the dissolution time of polyvinylidene fluoride and thus reduce the time for slurry preparation. An appropriate polyvinylidene fluoride crystallinity can ensure a good bonding force without causing the brittleness of the electrode plate. A higher melting point prevents polyvinylidene fluoride from melting and deactivating as the coating dries.

In some embodiments, the monomer containing a cyano group is selected from one or more of acrylonitrile, methacrylonitrile, halogenated acrylonitrile, and methoxyacrylonitrile.

In some embodiments, the monomer containing an ester group is selected from one or more of methyl acrylate, ethyl acrylate, propyl acrylate, butyl acrylate, isoamyl acrylate, isooctyl acrylate, methyl methacrylate, ethyl methacrylate, hydroxyethyl acrylate, and hydroxypropyl acrylate.

In some embodiments, the monomer containing an ester group is selected from isooctyl acrylate. Isooctyl acrylate makes the copolymer B have a lower glass transition temperature and better flexibility, which is beneficial to the processing and manufacturing of electrode plates.

Compared with fluorine-containing monomers, the above monomer containing a cyano group and monomer containing an ester group have low cost, are not subjected to policy restrictions, can be mass-produced, and can greatly reduce the cost of the binder.

In some embodiments, the mass ratio of the structural unit derived from the monomer containing a cyano group to the structural unit derived from the monomer containing an ester group in the copolymer B is 8:1-12:1. In some embodiments, the mass ratio of the structural unit derived from the monomer containing a cyano group to the structural unit derived from the monomer containing an ester group in the copolymer B is 8:1-11:1, or 8:1-10:1, or 8:1-9:1, or 9:1-12:1, or 10:1-12:1, or 11:1-12:1.

The monomer containing a cyano group can improve the mechanical strength and bonding performance of the copolymer B, which can further improve the cycling performance of the battery. A small amount of the monomer containing an ester group can improve the flexibility of the copolymer B and avoid the brittle fracture of the electrode plate; in addition, the ester group has a certain ability to absorb and preserve the electrolyte solution, which can solve the problem of poor ionic conductivity of a fluoropolymer A, and improve the ion-conducting ability of the binder.

In some embodiments, the copolymer B further comprises a structural unit derived from a monomer containing a group shown in formula I, Formula I

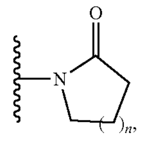

in which, n is selected from 0, 1, 2, or 3.

When n is 0, the group shown in formula I is

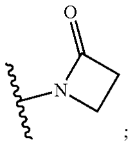 [SMILES: *N1CCC1=O]

;

when n is 1, the group shown in formula I is

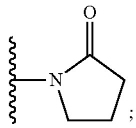

;

when n is 2, the group shown in formula I is

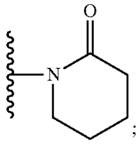 [SMILES: *N1CCCCC1=O]

;

and when n is 3, the group shown in formula I is

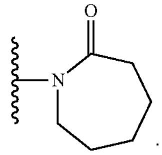 [SMILES: *N1CCCCCC1=O]

.

The electronegativity of the oxygen element in the group shown in formula I is greater than that of the nitrogen element in the cyano group; compared with the cyano group in the copolymer B, it is easier to form hydrogen bonds between the electrode active material and the conductive agent and the bond energy is higher, which can greatly improve the dispersibility of the slurry and increase the solid content of the slurry. At the same time, the addition of the group shown in formula I can further improve the bonding force of the binder and the cycling performance of the battery.

In some embodiments, the monomer containing a group shown in formula I is selected from one or more of N-vinylpyrrolidone and N-allyl-2-pyrrolidone. The above monomers have low cost and good stability, and are easy to process and synthesize.

In some embodiments, the mass content of the structural unit derived from the monomer containing a group shown in formula I is 0.1%-2%, based on the total mass of the copolymer B. In some embodiments, the mass content of the structural unit derived from the monomer containing a group shown in formula I is 0.5%-2% or 0.5%-1.5%, based on the total mass of the copolymer B. The dispersion of the copolymer B can be improved by containing a proper amount of a group shown in formula I, such that the prepared slurry is not easy to precipitate, which is helpful to increase the solid content of the slurry and further improve the load of the electrode.

A second aspect of the present application provides a binder, which comprises a copolymer C, wherein the copolymer C comprises a structural unit derived from a monomer containing a cyano group, a structural unit derived from a monomer containing an ester group, and a structural unit derived from a monomer containing a group shown in formula I, (I)

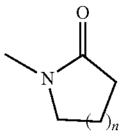

in which, n is selected from 0, 1, 2, or 3.

When n is 0, the group shown in formula I is

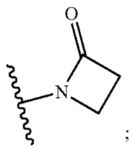 [SMILES: *N1CCC1=O]
;

when n is 1, the group shown in formula I is

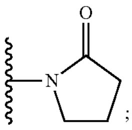 [SMILES: *N1CCCC1=O]
;

when n is 2, the group shown in formula I is

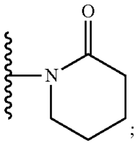 [SMILES: *N1CCCCC1=O]
;

and when n is 3, the group shown in formula I is

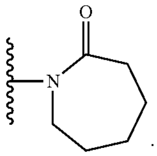 [SMILES: *N1CCCCCC1=O]
.

The electronegativity of the oxygen element in the group shown in formula I is greater than that of the nitrogen element in the cyano group; compared with the cyano group in the copolymer, it is easier to form hydrogen bonds between the electrode active material and the conductive agent and the bond energy is higher, which can greatly improve the dispersibility of the slurry and increase the solid content of the slurry.

The monomer containing a cyano group can effectively complex with the metals on the current collector and the electrode active material, which ensures a strong bonding force between the electrode active material and the current collector. The monomer containing an ester group can reduce the brittleness of the electrode plate and avoid the brittle fracture of the electrode plate.

Thus, in the present application, a copolymer C which comprises a structural unit derived from a monomer containing a cyano group, a structural unit derived from a monomer containing an ester group, and a structural unit derived from a monomer containing a group shown in formula I is used as a binder, such that the cost of the binder is reduced while the solid content of a slurry is not reduced, and the bonding performance of the binder and the cycling performance of a battery are improved.

In some embodiments, the monomer containing a cyano group is selected from one or more of acrylonitrile, methacrylonitrile, halogenated acrylonitrile, and methoxyacrylonitrile.

In some embodiments, the mass content of the structural unit derived from the monomer containing a cyano group is 80%-95%, based on the total mass of the copolymer C. In some embodiments, the mass content of the structural unit derived from the monomer containing a cyano group is 81%-95%, or 82%-95%, or 83%-95%, or 84%-95%, or 85%-95%, or 86%-95%, or 87%-95%, or 88%-95%, or 88%-94%, or 88%-93%, or 88%-92%, or 88%-91%, based on the total mass of the copolymer C. Within this range, the copolymer C can further improve the bonding performance of the binder and the cycling performance of the battery.

In some embodiments, the monomer containing an ester group is selected from one or more of methyl acrylate, ethyl acrylate, propyl acrylate, butyl acrylate, isoamyl acrylate, isooctyl acrylate, methyl methacrylate, ethyl methacrylate, hydroxyethyl acrylate, and hydroxypropyl acrylate.

In some embodiments, the monomer containing an ester group is selected from isooctyl acrylate. Isooctyl acrylate makes the copolymer C have a lower glass transition temperature and better flexibility, which is beneficial to the processing and manufacturing of electrode plates.

Compared with fluorine-containing monomers, the above monomer containing a cyano group and monomer containing an ester group have low cost, are not subjected to policy restrictions, can be mass-produced, and can greatly reduce the cost of the binder.

In some embodiments, the mass content of the structural unit derived from the monomer containing an ester group is 8%-12%, based on the total mass of the copolymer C. In some embodiments, the mass content of the structural unit derived from the monomer containing an ester group is 8%-11% or 9%-11%, based on the total mass of the copolymer C. Within this range, the copolymer C can further improve the bonding performance of the binder and the cycling performance of the battery.

In some embodiments, the mass ratio of the structural unit derived from the monomer containing a cyano group to the structural unit derived from the monomer containing an ester group in the copolymer C is 8:1-12:1. The monomer containing a cyano group can improve the mechanical strength and bonding performance of the copolymer B, which can further improve the cycling performance of the battery. A small amount of the monomer containing an ester group can improve the flexibility of the copolymer B and avoid the brittle fracture of the electrode plate; in addition, the ester group has a certain ability to absorb and preserve the electrolyte solution, which can solve the problem of poor ionic conductivity of the fluoropolymer A. Within this range, the copolymer C can further improve the bonding force of the electrode plate and the cycling performance of the battery.

In some embodiments, the monomer containing a group shown in formula I is selected from one or more of N-vinylpyrrolidone and N-allyl-2-pyrrolidone.

In some embodiments, the mass content of the structural unit derived from the monomer containing a group shown in formula I is 0.1%-2% or 0.5%-1.5%, based on the total mass of the copolymer C. The dispersion of the copolymer B can be improved by containing a proper amount of the group shown in formula I, such that the prepared slurry contains more electrode active material, which is helpful to increase the solid content of the slurry.

In some embodiments, the copolymer C has a weight average molecular weight of $4\times10^5$-$7\times10^5$. In some embodiments, the weight average molecular weight of the copolymer C is selected from $4\times10^5$-$7\times10^5$, or $4\times10^5$-$6\times10^5$, or $4\times10^5$-$5\times10^5$, or $5\times10^5$-$7\times10^5$, or $6\times10^5$-$7\times10^5$.

The control of the weight average molecular weight of the copolymer C can balance the bonding performance and processability of the binder. If the weight average molecular weight of the copolymer C is too low, the brittleness will be too high, such that the bonding force of the binder is insufficient. If the weight average molecular weight of the copolymer C is too high, it will be difficult to disperse an electrode active material. Moreover, the reasonable combination of copolymers with different molecular weights can improve the dispersion of the electrode active material, thereby improving the performance of the battery.

In some embodiments, the copolymer C has a volume average particle size Dv50 of 5-20 μm.

Herein, the term "Dv50" refers to the corresponding particle size when the cumulative particle size distribution percentage of the particles reaches 50%. Its physical meaning is that 50% of particles have a particle size larger than it and 50% have a particle size smaller than it. Dv50 is also called median diameter or median particle size.

If the average particle size Dv50 of the copolymer C is too high, it will be difficult to be dissolved, and the poor dispersion of the slurry will lead to agglomerates formed between a conductive agent or the electrode active material and the binder, which will block the filter screen and affect the production. When the agglomerates are washed to the coating head, it will generate coating particle scratches and affect the coating quality. An appropriate average particle size Dv50 helps to increase the dissolution rate of the copolymer C in a solvent and improve the processing efficiency of the electrode plate.

In some embodiments, the copolymer C has an intrinsic viscosity of 0.8-1.1 dl/g.

Herein, the term "intrinsic viscosity" refers to the most commonly used expression for the viscosity of a polymer solution. It is defined as the reduced viscosity when the concentration of the polymer solution tends to zero. That is to say, it represents the contribution of a single molecule to the viscosity of the solution, and is the viscosity reflecting the characteristics of the polymer, and its value does not change with the concentration. The intrinsic viscosity in the present invention refers to the intrinsic viscosity measured in N,N-dimethylacetamide at 30° C.

The following method is used to test the intrinsic viscosity in the present invention: firstly, weighing a finished powder sample ml (0.15-0.17 g) of the copolymer C and placing it in a 100 mL conical flask; adding V1 (50-60 ml) of N,N-dimethylacetamide with a pipette, sealing the mouth of the conical flask, and calculating the solution concentration C0=ml/V1, then placing the conical flask into a constant temperature water bath at 60° C. to dissolve same for 2.5 h; filtering the dissolved sample solution with a sand core filter to prevent particle impurities from clogging an Ubbelohde viscometer. Secondly, sucking the filtered N,N-dimethylacetamide with a disposable plastic straw, and rinsing the clean Ubbelohde viscometer with the solvent for at least 4-5 times; using the pipette to suck 10 mL of N,N-dimethylacetamide and injecting same into the Ubbelohde viscometer; placing the Ubbelohde viscometer in a constant temperature water bath at 30.0° C.±0.1° C. and keeping it for 15-20 min, then measuring the outflow time and recording it as t0. Finally, sucking the filtered glue solution prepared in the first step with the disposable plastic straw, and rinsing the plastic straw with the glue solution for at least 4-5 times; sucking 10 mL of the glue solution with the pipette and injecting same into the Ubbelohde viscometer; placing the Ubbelohde viscometer in a constant temperature water bath at 30.0° C.±0.1° C. and keeping it for 15-20 min, then measuring the outflow time and recording it as t1, and the measured value of the intrinsic viscosity is (t1/t0)/C0.

The control of the intrinsic viscosity of the copolymer C within an appropriate range can make the copolymer C have both excellent bonding performance and processability, which can avoid the failure of effective bonding due to too low viscosity, and avoid the difficulty of stirring, preparation and coating of the slurry due to too high viscosity.

A third aspect of the present application provides a preparation method for a binder, which comprises the following steps:

providing a monomer containing a cyano group, a monomer containing an ester group, and a monomer containing a group shown in formula I, (I)

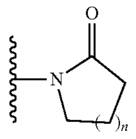

in which, n is selected from 0, 1, 2, or 3;

polymerizing the monomer containing a cyano group, the monomer containing an ester group, and the monomer containing a group shown in formula I to prepare a copolymer C under polymerizable conditions.

In some embodiments, the copolymer C is obtained by copolymerization using an anionic emulsifier by means of conventional emulsion polymerization.

In some embodiments, polymerizing the monomer containing a cyano group, the monomer containing an ester group, and the monomer containing a group shown in formula I under polymerizable conditions to prepare the copolymer C includes subjecting a first portion of the monomer containing a cyano group, the monomer containing an ester group, and the monomer containing a group shown in formula I with a first portion of a reaction solvent, a first portion of an emulsifier, a first portion of a pH buffering agent, and a first portion of an initiator to a first-stage reaction at a first polymerization temperature under a polymerization pressure; and after the first-stage reaction, adding a second portion of the monomer containing a cyano group, the monomer containing an ester group, and the monomer containing a group shown in formula I in the system, and subjecting them with a second portion of the reaction solvent, a second portion of the emulsifier, a second portion of the pH buffering agent, and the second portion of the initiator to a second-stage reaction at a second polymerization temperature.

In some embodiments, the emulsifier is selected from one or more of alkali metal salts or alkyl acid salts of perfluorooctanoic acids. The alkali metal salts of perfluorooctanoic acids are selected from one or more of sodium perfluorooctanoate and potassium perfluorooctanoate. The alkyl acid salts are selected from one or more of alkyl sulfates and alkyl sulfonates.

In some embodiments, the initiator is selected from peroxides, and the peroxides are selected from one or more of persulfate inorganic peroxides and peroxide carbonates, wherein the inorganic peroxides are selected from one or more of ammonium persulfate and potassium persulfate, and the peroxide carbonates are selected from diisopropyl peroxydicarbonate.

In some embodiments, the reaction solvent is deionized water.

In some embodiments, the pH buffering agent is selected from one or more of ammonia water, potassium carbonate, and potassium bicarbonate.

In some embodiments, the first portion of the monomer containing a cyano group, the monomer containing an ester group, and the monomer containing a group shown in formula I is 75-90% of the formula amount of each monomer. The first portion of the reaction solvent is 70-80% of the total amount of monomers added in the first-stage reaction, the first portion of the emulsifier is 0.2-0.3% of the total amount of monomers added in the first-stage reaction, the first portion of the pH buffering agent is 0.05-0.2% of the total amount of monomers added in the first-stage reaction, and the first portion of the initiator is 0.15-1% of the total amount of monomers added in the first-stage reaction. The first polymerization temperature is 70-80° C., and the reaction time of the first-stage reaction is 2-3 hours.

In some embodiments, the second portion of the monomer containing a cyano group, the monomer containing an ester group, and the monomer containing a group shown in formula I is 10-25% of the formula amount of each monomer. The second portion of the reaction solvent is 20-30% of the total amount of monomers added in the second-stage reaction, the second portion of the emulsifier is 0.05-0.1% of the total amount of monomers added in the second-stage reaction, and the second portion of the initiator is 0.05-0.3% of the total amount of monomers added in the second-stage reaction. The second polymerization temperature is 85-90° C., and the reaction time of the second-stage reaction is 3-4 hours.

In some embodiments, the mass ratio of the monomer containing a cyano group to the monomer containing an ester group is 8:1-12:1, and the mass content of monomer containing a group shown in formula I is 0.1%-2%, based on the total mass of the copolymer C.

In some embodiments, the monomer containing a cyano group is selected from one or more of acrylonitrile, methacrylonitrile, halogenated acrylonitrile, and methoxyacrylonitrile; and/or the monomer containing an ester group is selected from one or more of methyl acrylate, ethyl acrylate, propyl acrylate, butyl acrylate, isoamyl acrylate, isooctyl acrylate, methyl methacrylate, ethyl methacrylate, hydroxyethyl acrylate, and hydroxypropyl acrylate; and/or the monomer containing a group shown in formula I is selected from one or more of N-vinylpyrrolidone and N-allylpyrrolidone.

The method has low cost for preparing the monomer and mild reaction conditions, and can reduce the cost of the binder.

[Positive Electrode Plate]

The positive electrode plate includes a positive electrode current collector and a positive film layer provided on at least one surface of the positive electrode current collector, the positive film layer including a positive electrode active material.

As an example, the positive electrode current collector has two surfaces opposite in its own thickness direction, and the positive electrode film layer is provided on either or both of opposite surfaces of the positive electrode current collector.

In some embodiments, the positive electrode current collector may be a metal foil or a composite current collector. For example, as a metal foil, an aluminum foil can be used. The composite current collector may comprise a polymer material base layer and a metal layer formed on at least one surface of the polymer material base layer. The composite current collector can be formed by forming a metal material (aluminum, an aluminum alloy, nickel, a nickel alloy, titanium, a titanium alloy, silver and a silver alloy, etc.) on a polymer material substrate (such as polypropylene (PP), polyethylene terephthalate (PET), polybutylene terephthalate (PBT), polystyrene (PS), polyethylene (PE), etc.).

In some embodiments, the positive electrode active material can be a positive electrode active material known in the art for batteries. As an example, the positive electrode active material may comprise at least one of the following materials: lithium-containing phosphates of an olivine structure, lithium transition metal oxides, and their respective modified compounds. However, the present application is not limited to these materials, and other conventional materials that can be used as positive electrode active materials for batteries may also be used. These positive electrode active materials may be used alone or in combination of two or more. Among them, examples of lithium transition metal oxides may include, but are not limited to, at least one of lithium cobalt oxide (e.g. $LiCoO_2$), lithium nickel oxide (e.g. $LiNiO_2$), lithium manganese oxide (e.g. $LiMnO_2$, $LiMn_2O_4$), lithium nickel cobalt oxide, lithium manganese cobalt oxide, lithium nickel manganese oxide, lithium nickel cobalt manganese oxide (e.g. $LiNi_{1/3}Co_{1/3}Mn_{1/3}O_2$ (also referred to as $NCM_{333}$), $LiNi_{0.5}Co_{0.2}Mn_{0.3}O_2$ (also referred to as $NCM_{523}$), $LiNi_{0.5}Co_{0.25}Mn_{0.25}O_2$ (also referred to as $NCM_{211}$), $LiNi_{0.6}Co_{0.2}Mn_{0.2}O_2$ (also referred to as $NCM_{622}$), $LiNi_{0.8}Co_{0.1}Mn_{0.1}O_2$ (also referred to as $NCM_{811}$)), lithium nickel cobalt aluminum oxide (e.g. $LiNi_{0.85}Co_{0.15}Al_{0.05}O_2$), and modified compounds thereof, etc. Examples of lithium-containing phosphates of olivine structure may include, but are not limited to, at least one of lithium iron phosphate (e.g. $LiFePO_4$ (also referred to as LFP)), lithium iron phosphate and carbon composites, lithium manganese phosphate (e.g. $LiMnPO_4$), lithium manganese phosphate and carbon composites, lithium iron manganese phosphate, and lithium iron manganese phosphate and carbon composites.

In some embodiments, the positive electrode film layer also optionally comprises a conductive agent. As an example, the conductive agent may include at least one of superconducting carbon, acetylene black, carbon black, Ketjen black, carbon dots, carbon nanotubes, graphene, and carbon nanofibers.

In some embodiments, the positive electrode plate can be prepared as follows: the above components for preparing the positive electrode plate, such as a positive electrode active material, a conductive agent, the binder of the present invention and any other components, are dispersed in a solvent (e.g. N-methylpyrrolidone) to form a positive electrode slurry; and the positive electrode current collector is coated with the positive electrode slurry, followed by the procedures such as drying and cold pressing, so as to obtain the positive electrode plate.

[Negative Electrode Plate]

The negative electrode plate comprises a negative electrode current collector and a negative electrode film layer provided on at least one surface of the negative electrode current collector, the negative electrode film layer comprising a negative electrode active material.

As an example, the negative electrode current collector has two surfaces opposite in its own thickness direction, and the negative electrode film layer is provided on either or both of the two opposite surfaces of the negative electrode current collector.

In some embodiments, the negative electrode current collector may be a metal foil or a composite current collector. For example, as a metal foil, a copper foil can be used. The composite current collector may comprise a polymer material base layer and a metal layer formed on at least one surface of the polymer material substrate. The composite current collector can be formed by forming a metal material (copper, a copper alloy, nickel, a nickel alloy, titanium, a titanium alloy, silver and a silver alloy, etc.) on a polymer material substrate (e.g., polypropylene (PP), polyethylene terephthalate (PET), polybutylene terephthalate (PBT), polystyrene (PS), polyethylene (PE), etc.).

In some embodiments, the negative electrode active material can be a negative electrode active material known in the art for batteries. As an example, the negative electrode active material may comprise at least one of the following materials: artificial graphite, natural graphite, soft carbon, hard carbon, a silicon-based material, a tin-based material and lithium titanate, etc. The silicon-based material may be selected from at least one of elemental silicon, silicon oxides, silicon carbon composites, silicon nitrogen composites, and silicon alloys. The tin-based material may be selected from at least one of elemental tin, tin oxides, and tin alloys. However, the present application is not limited to these materials, and other conventional materials that can be used as negative electrode active materials for batteries can also be used. These negative electrode active materials may be used alone or as a combination of two or more.

In some embodiments, the negative electrode film layer also optionally comprises other binders. The binder may be selected from at least one of a butadiene styrene rubber (SBR), polyacrylic acid (PAA), sodium polyacrylate (PAAS), polyacrylamide (PAM), polyvinyl alcohol (PVA), sodium alginate (SA), polymethacrylic acid (PMAA) and carboxymethyl chitosan (CMCS).

In some embodiments, the negative electrode film layer also optionally comprises a conductive agent. The conductive agent may be selected from at least one of superconductive carbon, acetylene black, carbon black, ketjenblack, carbon dots, carbon nanotubes, graphene, and carbon nanofibers.

In some embodiments, the negative electrode film layer also optionally comprises other auxiliary agents, such as a thickener (e.g. sodium carboxymethyl cellulose (CMC-Na)), etc.

In some embodiments, the negative electrode plate can be prepared as follows: dispersing the above components for preparing the negative electrode plate, such as negative electrode active material, conductive agent, binder and any other components, in a solvent (e.g. deionized water) to form a negative electrode slurry; and coating a negative electrode current collector with the negative electrode slurry, followed by procedures such as drying and cold pressing, so as to obtain the negative electrode plate.

[Electrolyte]

The electrolyte functions to conduct ions between the positive electrode plate and the negative electrode plate. The type of the electrolyte is not specifically limited in the present application, and can be selected according to actual requirements. For example, the electrolyte may be in a liquid state, a gel state or an all-solid state.

In some embodiments, an electrolyte solution is used as the electrolyte. The electrolyte solution includes an electrolyte salt and a solvent.

In some embodiments, the electrolyte salt may be selected from at least one of lithium hexafluorophosphate, lithium tetrafluoroborate, lithium perchlorate, lithium hexafluoroarsenate, lithium bisfluorosulfonimide, lithium bistrifluoromethanesulfonimide, lithium trifluoromethanesulfonate, lithium difluorophosphate, lithium difluorooxalate borate, lithium dioxalate borate, lithium difluorodioxalate phosphate and lithium tetrafluorooxalate phosphate.

In some embodiments, the solvent may be selected from at least one of ethylene carbonate, propylene carbonate, ethyl methyl carbonate, diethyl carbonate, dimethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, dimethyl sulfone, ethyl methyl sulfone, and diethyl sulfone.

In some embodiments, the electrolyte solution also optionally comprises an additive. For example, the additive may include a negative electrode film-forming additive and a positive electrode film-forming additive, and may further include an additive that can improve certain performances of the battery, such as an additive that improves the overcharge performance of the battery, or an additive that improves the high temperature or low-temperature performance of the battery.

[Separator]

In some embodiments, the secondary battery further comprises a separator. The type of the separator is not particularly limited in the present application, and any well-known porous-structure separator with good chemical stability and mechanical stability may be selected.

In some embodiments, the material of the separator may be selected from at least one of glass fibers, non-woven fabrics, polyethylene, polypropylene and polyvinylidene fluoride. The separator may be either a single-layer film or a multi-layer composite film, and is not limited particularly. When the separator is a multi-layer composite film, the materials in the respective layers may be same or different, which is not limited particularly.

[Secondary Battery]

The present application provides a secondary battery, including an electrode assembly and an electrolyte solution, wherein the electrode assembly includes a positive electrode plate, a separator, a negative electrode plate, and the positive electrode plate includes a positive active material and the binder in any embodiment of the present application or the binder prepared by the preparation method in any embodiment of the present application. The secondary battery has better cycling performance.

In some embodiments, the positive electrode active material is a lithium-containing transition metal oxide, which is optionally lithium iron phosphate or doped and modified materials thereof, or at least one of conductive carbon-coated modified materials, conductive metal-coated modified materials, or conductive polymer-coated modified materials thereof.

In some embodiments, the lithium-containing transition metal oxide is optionally lithium cobaltate, lithium nickel manganese cobaltate, lithium nickel manganese aluminate, lithium iron phosphate, lithium vanadium phosphate, lithium cobalt phosphate, lithium manganese phosphate, lithium iron manganese phosphate, lithium iron silicate, lithium vanadium silicate, lithium cobalt silicate, lithium manganese silicate, spinel lithium manganate, spinel lithium nickel manganate, lithium titanate, or doped and modified materials thereof, or at least one of conductive carbon-coated modified materials, conductive metal-coated modified materials, or conductive polymer-coated modified materials thereof.

In some embodiments, an electrode assembly may be formed by a positive electrode plate, a negative electrode plate and a separator by a winding process or a stacking process.

Typically, a secondary battery comprises a positive electrode plate, a negative electrode plate, an electrolyte and a separator. During the charge/discharge of the battery, active ions are intercalated and de-intercalated back and forth between a positive electrode plate and a negative electrode plate. The electrolyte functions to conduct ions between the positive electrode plate and the negative electrode plate. The separator is provided between the positive electrode plate and the negative electrode plate, and mainly prevents the positive and negative electrodes from short-circuiting and enables ions to pass through.

In some embodiments, the secondary battery may comprise an outer package. The outer package may be used to encapsulate the above electrode assembly and electrolyte.

In some embodiments, the outer package of the secondary battery can be a hard shell, for example, a hard plastic shell, an aluminum shell, a steel shell, etc. The outer package of the secondary battery may also be a soft bag, such as a pouch-type soft bag. The material of the soft bag may be plastics, and the examples of plastics may comprise polypropylene, polybutylene terephthalate, polybutylene succinate, etc.

Figure 3:
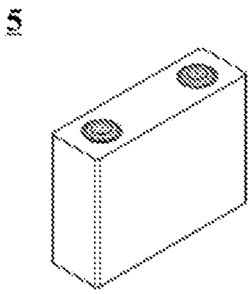
FIG. 3 is a schematic diagram of a secondary battery according to an embodiment of the present application.

The shape of the secondary battery is not particularly limited in the present application and may be cylindrical, square or of any other shape. For example, FIG. 3 shows a secondary battery 5 with a square structure as an example.

Figure 4:
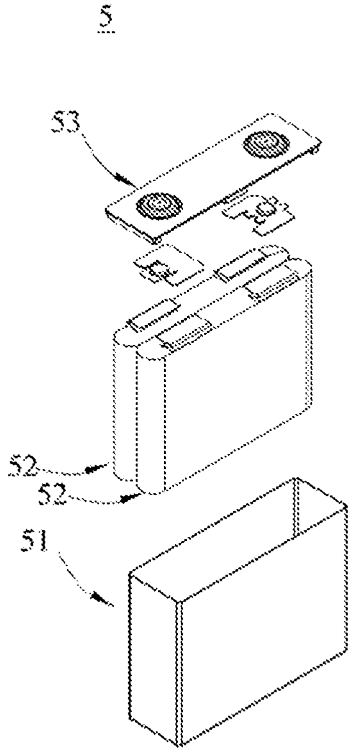
FIG. 4 is an exploded view of the secondary battery according to the embodiment of the present application as shown in FIG. 3.

In some embodiments, referring to FIG. 4, the outer package may comprise a housing 51 and a cover plate 53. Herein, the housing 51 may comprise a bottom plate and side plates connected to the bottom plate, and the bottom plate and the side plates enclose to form an accommodating cavity. The housing 51 has an opening in communication with the accommodating cavity, and the cover plate 53 may cover the opening to close the accommodating cavity. The positive electrode plate, the negative electrode plate, and the separator may be subjected to a winding process or a laminating process to form an electrode assembly 52. The electrode assembly 52 is encapsulated in the accommodating cavity. The electrolyte solution infiltrates the electrode assembly 52. The number of the electrode assemblies 52 contained in the secondary battery 5 may be one or more, and can be selected by those skilled in the art according to actual requirements.

A fourth aspect of the present application provides an electrode, including an electrode active material and a binder composition or a binder in any embodiment, the electrode active material is optionally a positive electrode active material, and the positive electrode active material is a lithium-containing transition metal oxide. In some embodiments, the lithium-containing transition metal oxide is optionally lithium cobaltate, lithium nickel manganese cobaltate, lithium nickel manganese aluminate, lithium iron phosphate, lithium vanadium phosphate, lithium cobalt phosphate, lithium manganese phosphate, lithium iron manganese phosphate, lithium iron silicate, lithium vanadium silicate, lithium cobalt silicate, lithium manganese silicate, spinel lithium manganate, spinel lithium nickel manganate, lithium titanate, or doped and modified materials thereof, or at least one of conductive carbon-coated modified materials, conductive metal-coated modified materials, or conductive polymer-coated modified materials thereof. In some embodiments, the lithium-containing transition metal oxide is optionally lithium iron phosphate or doped and modified materials thereof, or at least one of conductive carbon-coated modified materials, conductive metal-coated modified materials, or conductive polymer-coated modified materials thereof.

The electrode has a higher bonding force, which makes the battery have better cycling performance.

[Battery Module]

In some embodiments, the secondary battery can be assembled into a battery module, and the number of the secondary batteries contained in the battery module may be one or more, and the specific number can be selected by those skilled in the art according to the application and capacity of the battery module.

Figure 5:
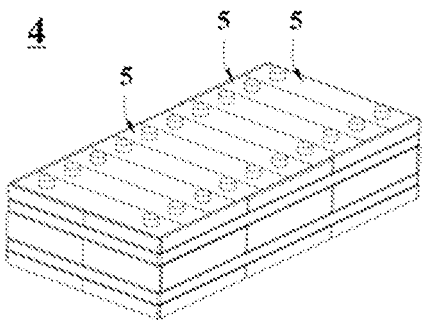
FIG. 5 is a schematic diagram of a battery module according to an embodiment of the present application.

FIG. 5 shows a battery module 4 as an example. Referring to FIG. 5, in the battery module 4, a plurality of secondary batteries 5 may be sequentially arranged in the length direction of the battery module 4. Apparently, the secondary batteries may also be arranged in any other manner. Furthermore, the plurality of secondary batteries 5 may be fixed by fasteners.

Optionally, the battery module 4 may also comprise a housing with an accommodating space, and a plurality of secondary batteries 5 are accommodated in the accommodating space.

[Battery Pack]

In some embodiments, the above battery module may also be assembled into a battery pack, the number of the battery modules contained in the battery pack may be one or more, and the specific number can be selected by those skilled in the art according to the application and capacity of the battery pack.

Figure 6:
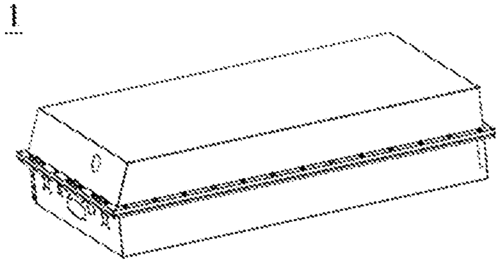
FIG. 6 is a schematic diagram of a battery pack according to an embodiment of the present application.
Figure 7:
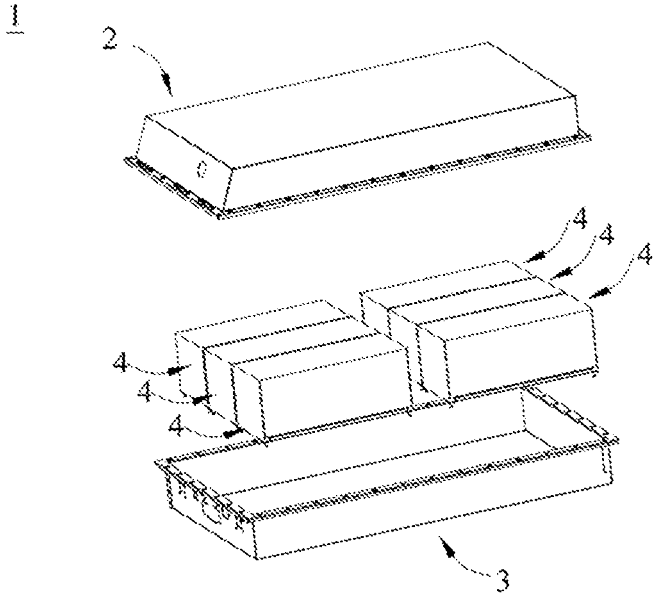
FIG. 7 is an exploded view of the battery pack according to the embodiment of the present application as shown in FIG. 6.

FIG. 6 and FIG. 7 show a battery pack 1 as an example. Referring FIG. 6 and FIG. 7, the battery pack 1 can include a battery box and a plurality of battery modules 4 provided in the battery box. The battery box comprises an upper box body 2 and a lower box body 3, wherein the upper box body 2 may cover the lower box body 3 to form a closed space for accommodating the battery modules 4. A plurality of battery modules 4 may be arranged in the battery case in any manner.

[Power Consuming Device]

A sixth aspect of the present application provides a power consuming device, including a secondary battery in any embodiment, a battery module in any embodiment, or a battery pack in any embodiment. The power consuming device has a longer battery service life.

The secondary battery, battery module or battery pack can be used as a power source of the power consuming device or as an energy storage unit of the power consuming device. The power consuming device may include a mobile device (e.g., a mobile phone, a laptop computer, etc.), an electric vehicle (e.g., a pure electric vehicle, a hybrid electric vehicle, a plug-in hybrid electric vehicle, an electric bicycle, an electric scooter, an electric golf cart, an electric truck, etc.), an electric train, ship, and satellite, an energy storage system, etc., but is not limited thereto.

As for the power consuming device, the secondary battery, battery module or battery pack can be selected according to the usage requirements thereof.

Figure 8:
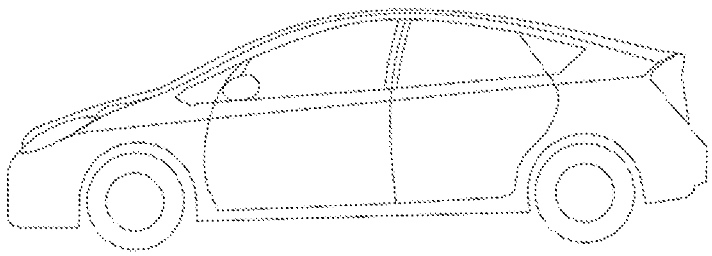
FIG. 8 is a schematic diagram of a power consuming device using a secondary battery according to an embodiment of the present application as a power source.

FIG. 8 shows an example of the power consuming device. The power consuming device may be a pure electric vehicle, a hybrid electric vehicle, a plug-in hybrid electric vehicle, etc. In order to meet the requirements of the power consuming device for a high power and a high energy density of a secondary battery, a battery pack or a battery module may be used.

As another example, the device may be a mobile phone, a tablet computer, a laptop computer, etc. The device is generally required to be thin and light, and may have a secondary battery used as a power source.

EXAMPLES

Hereinafter, the examples of the present application will be explained. The examples described below are exemplary and are merely for explaining the present application, and should not be construed as limiting the present application. The examples in which techniques or conditions are not specified are based on the techniques or conditions described in documents in the art or according to the product introduction. The reagents or instruments used therein for which manufacturers are not specified are all conventional products that are commercially available.

Example 1

1) Preparation of Binder Comprising Copolymer C

The preparation method for the copolymer C is as follows: using a 10 L stainless steel autoclave with a rotation speed of 100 r/min as a polymerization kettle. Firstly, checking the tightness of a polymerization system, and then vacuumizing the autoclave and filling it with nitrogen to discharging oxygen, and repeating this process 3 times. Adding 2,000 g of deionized water, 1.6 g of ammonia water and 3.2 g of sodium alkyl sulfate, then adding 1,408 g of an acrylonitrile monomer, 176 g of an isooctyl acrylate monomer and 16 g of N-vinylpyrrolidone monomer, vacuumizing same until the polymerization pressure is 4.2 Mpa, raising the temperature to 55° C., standing same for 0.8 h, then adding 8 g of ammonium persulfate, raising the temperature to 75° C., and polymerizing same for 2-3 h with stirring. Continuously adding 352 g of an acrylonitrile monomer, 44 g of an isooctyl acrylate monomer, 4 g of a N-vinylpyrrolidone monomer, 400 g of deionized water, 1.6 g of alkyl sodium sulfate, 0.8 g of ammonium persulfate to the polymerization kettle, raising the temperature to 90° C., and maintaining the temperature for reaction for 4 h. Carrying out flash evaporation to obtain a polymerized article, then washing same with deionized water until the conductivity of the a washing liquid is less than $1*10^{-8}$ s/cm, and vacuum drying same to obtain a N-vinylpyrrolidone-acrylonitrile-isooctyl acrylate copolymer. The prepared copolymer has a weight average molecular weight of 700,000, a particle size Dv50 of 15 μm, and an intrinsic viscosity of 1.1 dl/g.

The preparation method for the binder is as follows: adding 4 g of polyvinylidene fluoride (fluoropolymer polymer A) and 4 g of N-vinylpyrrolidone-acrylonitrile-isooctyl acrylate copolymer into 250 g of an N-methylpyrrolidone solution, and stirring same in a stirring and dispersing machine at a rotation speed of 500 r/min for 90 min, and them removing the bubbles on an ultrasonic cleaner for 30 min after stirring. The polyvinylidene fluoride is a 601A product produced by HEC company, which is synthesized by an emulsion method, and has a weight average molecular weight of 900,000, a particle size Dv50 of 20 μm, a crystallinity of 40%, and a melting point of 170° C.

2) Preparation of Button Battery

Adding 398 g of lithium iron phosphate and 2.8 g of conductive carbon black into an agate mortar and dry mixing same for 15 min. Adding the dry-mixed product to the binder, and stirring same on a stirring disperser at a rotation speed of 1200 r/min for 90 min, so as to prepare a positive electrode slurry for a lithium battery.

Scrape-coating the above slurry on a carbon-coated aluminum foil and baking at 110° C. for 15 min, cutting same into a disc with a diameter of 15 mm after cold pressing, and then making same into a button battery with a metal lithium plate, a separator, and an electrolyte solution.

3) Separator

A polypropylene film is used as a separator.

4) Preparation of Electrolyte Solution

In an argon atmosphere glove box ($H_2O$<0.1 ppm, $O_2$<0.1 ppm), mixing organic solvents of ethylene carbonate (EC)/ethyl methyl carbonate (EMC) at a volume ratio of 3/7 until uniform, adding $LiPF_6$ lithium salt and dissolving it in the organic solvent, after stirring uniformly, preparing a 1 M $LiPF_6$ EC/EMC solution to obtain an electrolyte solution.

The batteries of examples 2-25 and the button battery of comparative example 1 are prepared in a similar manner to the button battery of example 1, but the raw materials and proportions thereof for preparing the copolymer C or the proportions of the components in the binder are adjusted. See table 1 for the specific parameters.

In examples 2-7, the mass ratio of polyvinylidene fluoride to the copolymer C is adjusted, and other parameters are the same as in example 1. See table 1 for the specific parameters.

In examples 8-11, the polymerization ratio of the acrylonitrile monomer to the isooctyl acrylate monomer in N-vinylpyrrolidone-acrylonitrile-isooctyl acrylate copolymer is adjusted, and other parameters are the same as in example 1. See table 1 for the specific parameters.

In examples 12-13, the polymerization ratio of the acrylonitrile monomer to the isooctyl acrylate monomer in N-vinylpyrrolidone-acrylonitrile-isooctyl acrylate copolymer is adjusted, and the mass ratio of polyvinylidene fluoride to N-vinylpyrrolidone-acrylonitrile-isooctyl acrylate copolymer is set at 2:1, and other parameters are the same as in example 1. See table 1 for the specific parameters.

In examples 14-15, the polymerization ratio of the acrylonitrile monomer to the isooctyl acrylate monomer in N-vinylpyrrolidone-acrylonitrile-isooctyl acrylate copolymer is adjusted, and the mass ratio of polyvinylidene fluoride to N-vinylpyrrolidone-acrylonitrile-isooctyl acrylate copolymer is set at 3:1, and other parameters are the same as in example 1. See table 1 for the specific parameters.

In examples 16-17, the polymerization ratio of the acrylonitrile monomer to the isooctyl acrylate monomer in N-vinylpyrrolidone-acrylonitrile-isooctyl acrylate copolymer is adjusted, and the mass ratio of polyvinylidene fluoride to N-vinylpyrrolidone-acrylonitrile-isooctyl acrylate copolymer is set at 4:1, and other parameters are the same as in example 1. See table 1 for the specific parameters.

In examples 18-20, the mass of N-vinylpyrrolidone added in the polymer B is adjusted, and the molar ratio of the acrylonitrile monomer to the isooctyl acrylate monomer in N-vinylpyrrolidone-acrylonitrile-isooctyl acrylate copolymer is set at 10:1, and other parameters are the same as in example 1. See table 1 for the specific parameters.

In examples 21-22, in the process of copolymer preparation, the reaction time is adjusted from 4 h to 3 h and 2.5 h successively after a second fluid supplementation and the temperature is raised to 90° C., and the molar ratio of the acrylonitrile monomer to the isooctyl acrylate monomer in a N-vinylpyrrolidone modified acrylonitrile-isooctyl acrylate copolymer is set at 10:1, and other parameters and steps are the same as in example 1. See table 1 for the specific parameters.

In example 23, an acrylonitrile-isooctyl acrylate copolymer modified by N-allyl-2-pyrrolidone is used, and other parameters are the same as in example 1. See table 1 for the specific parameters.

In example 24, N-vinylpyrrolidone is not added in the process of copolymer preparation, and the molar ratio of the acrylonitrile monomer to the isooctyl acrylate monomer in the acrylonitrile-isooctyl acrylate copolymer is set at 10:1, and other parameters are the same as in example 1. See table 1 for the specific parameters.

The polyvinylidene fluoride used in example 25 is a 401A product produced by HEC company, which has a weight average molecular weight of 600,000, and other steps are the same as in example 1. See table 1 for the specific parameters.

In comparative example 1, polyvinylidene fluoride is used as the binder alone; in comparative example 2, the N-vinylpyrrolidone modified acrylonitrile-isooctyl acrylate copolymer prepared in example 9 is used as the binder alone, and in comparative example 3, the acrylonitrile-isooctyl acrylate copolymer prepared in example 24 is used as the binder alone, and other steps are the same as in example 1. See table 1 for the specific parameters.

Relevant parameters of the binder of the above examples 1-25 and comparative examples 1-3 are shown in table 1 below.

In addition, performance tests are performed on the electrode plates and batteries obtained in above examples 1-25 and comparative examples 1-3. The test method is as follows, and the test results are shown in table 1.

1. Structural Unit Type Test of Binder

Subjecting a sample to KBr tabletting using a tablet transmission method, and deducting the KBr background blank by the transmission method to obtain the sample test spectrum. Instrument model: Nicolet 5700 (Thermo Nicolet, USA), standard linearity: better than 0.07%, resolution: 0.09 $cm^{-1}$, wavenumber range: 400-4000 $cm^{-1}$, sensitivity <$9.65*10^{-5}$ Abls. It is used to detect the structure and chemical bonds of molecules.

2. Molecular Weight Test

Using a Waters 2695 Isocratic HPLC gel chromatograph (differential refractive index detector 2141). Using a polystyrene solution sample with a mass fraction of 3.0% as a reference, and selecting a matched chromatographic column (oily: Styragel HT5 DMF7.8*300 mm+Styragel HT4). Using a purified N-methylpyrrolidone (NMP) solvent to prepare 3.0% of a binder glue solution, and allowing the prepared solution to stand for one day for later use. During the test, sucking tetrahydrofuran with a syringe first for rinse, and repeating this process several times. Then sucking 5 ml of the test solution, removing the air in the syringe, and wiping the needle tip to dry. Finally, slowly injecting the sample solution into the injection port. The data is obtained after the display is stable.

3. Bonding Force Test (Between Positive Electrode Plate Active Material Layer and Positive Electrode Current Collector)

With reference to the national standard GBT 2790-1995 “Adhesives-180° Peel Strength Test Method”, the bonding force test process of the examples and comparative examples of the present application is as follows:

using a blade to cut a sample with a width of 30 mm*a length of 100-160 mm, and pasting a special double-sided adhesive tape with a width of 20 mm*a length of 90-150 mm on a steel plate. Pasting the electrode plate sample cut earlier on the double-sided adhesive tape with the test side facing down, and then rolling same three times in the same direction with a pressure roller.

Inserting a paper tape with a width equal to that of the electrode plate and a length 80-200 mm longer than the that of the sample under the electrode plate, and fixing it with a crepe glue.

Turning on the power of a Sansi tensile machine (the sensitivity is 1 N) and the indicator light is on, then adjusting a limit block to a suitable position, and fixing the end of the steel plate that is not pasted with the electrode plate with a lower clamp. Folding the paper tape upwards, fixing it with an upper clamp, and using “Up” and “Down” buttons on a manual controller attached to the tensile machine to adjust the position of the upper clamp. Then carrying out the test and reading the value, so as to obtain the bonding force comparison data of example 1 and comparative example 1 as shown in accompanying drawing 1

4. Battery Capacity Retention Rate Test

Figure 2:
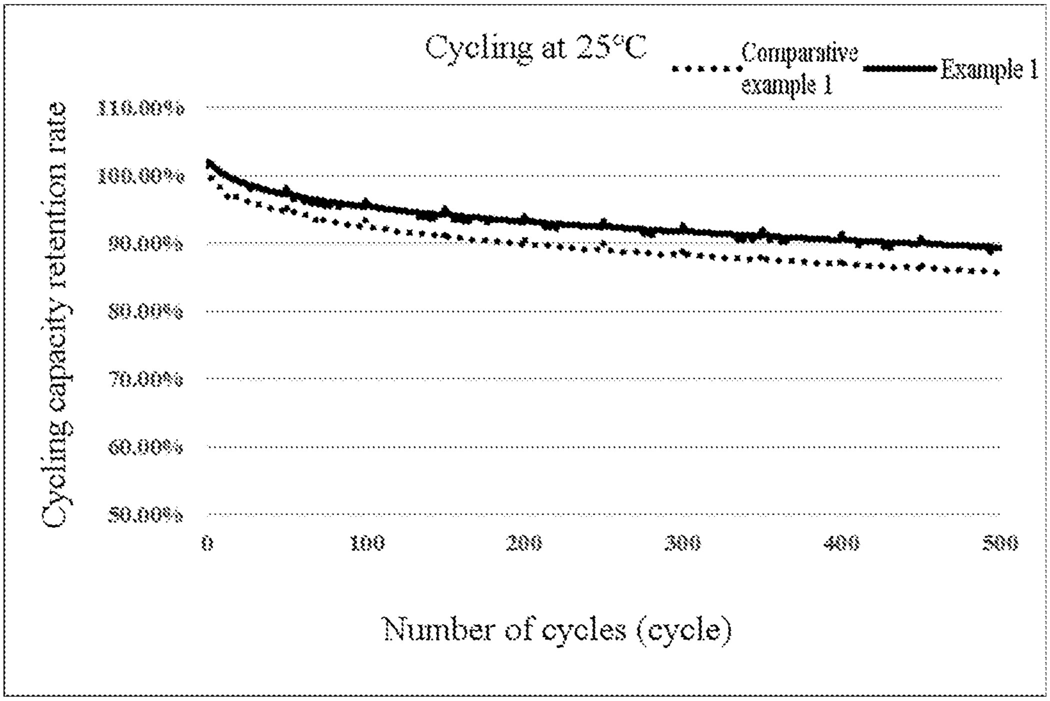
FIG. 2 is a cycling test curve of the battery prepared in example 1 and comparative example 1.

Taking example 1 as an example, the test process of the capacity retention rate of the battery is as follows: at 25° C., charging the battery corresponding to example 1 at a constant current of 1/3 C to 3.65 V, then charging same at a constant voltage of 3.65 V to a current of 0.05 C, leaving it to stand for 5 minutes, and then discharging it to 2.5 V at 1/3 C. The resulting capacity is recorded as the initial capacity C0. Repeating the above steps for the same battery above, and recording the discharge capacity Cn of the battery after the n-th cycle at the same time, then the capacity retention rate of the battery Pn=Cn/C0*100% after each cycle. With the values of the 100 points of P1, P2, . . . , and P100 as the ordinate and the corresponding cycle times as the abscissa, the curves of capacity retention rate of the battery and cycle times of example 1 and comparative example 1 as shown in FIG. 2 are obtained.

During this test, the first cycle corresponds to n=1, the second cycle corresponds to n=2, . . . and the 100th cycle corresponds to n=100. The battery capacity retention rate data corresponding to example 1 in table 1 is the data measured after 500 cycles under the above test conditions, that is, the value of P500. The test processes of comparative example 1 and other examples are the same as above.

5. Solid Content Test of Slurry

Test method of solid content: preparing a glass petri dish and recording its weight as $m_1$, taking a part of the prepared positive electrode slurry and placing into the glass petri dish and recording the total weight as $m_2$, placing the petri dish containing the positive electrode slurry into a drying oven for heating at a temperature of 120° C. for 1 h. Weighing the dried petri dish and recording its weight as $m_3$, the solid content=$(m_3-m_1)/(m_2-m_3)$*100%.

TABLE 1

Parameters and test results of examples 1-25 and comparative examples 1-3

| No. | Fluoro polymer A | Weight average molecular weight of fluoro polymer A | Copolymer B | Weight average molecular weight of copolymer B | Mass of polyvinylidene fluoride: mass of copolymer B in binder | Mass ratio of structural unit derived from acryl onitrile to structural unit derived from isooctyl acrylate in copolymer B | Mass content of structural unit derived from acryl onitrile monomer in copolymer B |
|---|---|---|---|---|---|---|---|
| Example 1 | Polyvinylidene fluoride | 90 | N-vinylpyrrolidone-acrylonitrile-isooctyl acrylate copolymer | 70 | 1:1 | 8:1 | 88% |
| Example 2 | Polyvinylidene fluoride | 90 | N-vinylpyrrolidone-acrylonitrile-isooctyl acrylate copolymer | 70 | 2:1 | 8:1 | 88% |
| Example 3 | Polyvinylidene fluoride | 90 | N-vinylpyrrolidone-acrylonitrile-isooctyl acrylate copolymer | 70 | 3:1 | 8:1 | 88% |
| Example 4 | Polyvinylidene fluoride | 90 | N-vinylpyrrolidone-acrylonitrile-isooctyl acrylate copolymer | 70 | 4:1 | 8:1 | 88% |
| Example 5 | Polyvinylidene fluoride | 90 | N-vinylpyrrolidone-acrylonitrile-isooctyl acrylate copolymer | 70 | 1:2 | 8:1 | 90% |
| Example 6 | Polyvinylidene fluoride | 90 | N-vinylpyrrolidone-acrylonitrile-isooctyl acrylate copolymer | 70 | 1:3 | 8:1 | 90% |
| Example 7 | Polyvinylidene fluoride | 90 | N-vinylpyrrolidone-acrylonitrile-isooctyl acrylate copolymer | 70 | 1:4 | 8:1 | 90% |
| Example 8 | Polyvinylidene fluoride | 90 | N-vinylpyrrolidone-acrylonitrile-isooctyl acrylate copolymer | 70 | 1:1 | 9:1 | 89.1% |

TABLE 1-continued

Parameters and test results of examples 1-25 and comparative examples 1-3

| | | | | | | | |
|---|---|---|---|---|---|---|---|
| Example 9 | Polyvinylidene fluoride | 90 | N-vinylpyrrolidone-acrylonitrile-isooctyl acrylate copolymer | 70 | 1:1 | 10:1 | 90% |
| Example 10 | Polyvinylidene fluoride | 90 | N-vinylpyrrolidone-acrylonitrile-isooctyl acrylate copolymer | 70 | 1:1 | 11:1 | 90.75% |
| Example 11 | Polyvinylidene fluoride | 90 | N-vinylpyrrolidone-acrylonitrile-isooctyl acrylate copolymer | 70 | 1:1 | 12:1 | 92.31% |
| Example 12 | Polyvinylidene fluoride | 90 | N-vinylpyrrolidone-acrylonitrile-isooctyl acrylate copolymer | 70 | 2:1 | 9:1 | 89.1% |
| Example 13 | Polyvinylidene fluoride | 90 | N-vinylpyrrolidone-acrylonitrile-isooctyl acrylate copolymer | 70 | 2:1 | 10:1 | 90% |
| Example 14 | Polyvinylidene fluoride | 90 | N-vinylpyrrolidone-acrylonitrile-isooctyl acrylate copolymer | 70 | 3:1 | 9:1 | 89.1% |
| Example 15 | Polyvinylidene fluoride | 90 | N-vinylpyrrolidone-acrylonitrile-isooctyl acrylate copolymer | 70 | 3:1 | 10:1 | 90% |
| Example 16 | Polyvinylidene fluoride | 90 | N-vinylpyrrolidone-acrylonitrile-isooctyl acrylate copolymer | 70 | 4:1 | 9:1 | 89.1% |
| Example 17 | Polyvinylidene fluoride | 90 | N-vinylpyrrolidone-acrylonitrile-isooctyl acrylate copolymer | 70 | 4:1 | 10:1 | 90% |
| Example 18 | Polyvinylidene fluoride | 90 | N-vinylpyrrolidone-acrylonitrile-isooctyl acrylate copolymer | 70 | 1:1 | 10:1 | 90.45% |
| Example 19 | Polyvinylidene fluoride | 90 | N-vinylpyrrolidone-acrylonitrile-isooctyl acrylate copolymer | 70 | 1:1 | 10:1 | 89.55% |
| Example 20 | Polyvinylidene fluoride | 90 | N-vinylpyrrolidone-acrylonitrile-isooctyl acrylate copolymer | 70 | 1:1 | 10:1 | 89.09% |
| Example 21 | Polyvinylidene fluoride | 90 | N-vinylpyrrolidone-acrylonitrile-isooctyl acrylate copolymer | 55 | 1:1 | 10:1 | 90% |

TABLE 1-continued

Parameters and test results of examples 1-25 and comparative examples 1-3

| | | | | | | | |
|---|---|---|---|---|---|---|---|
| Example 22 | Polyvinylidene fluoride | 90 | N-vinylpyrrolidone-acrylonitrile-isooctyl acrylate copolymer | 40 | 1:1 | 10:1 | 90% |
| Example 23 | Polyvinylidene fluoride | 90 | Acrylonitrile-isooctyl acrylate copolymer modified by N-allyl-2-pyrrolidone | 70 | 1:1 | 10:1 | 90% |
| Example 24 | Polyvinylidene fluoride | 90 | Acrylonitrile-isooctyl acrylate copolymer | 70 | 1:1 | 10:1 | 90.91% |
| Example 25 | Polyvinylidene fluoride | 60 | N-vinylpyrrolidone acrylonitrile-isooctyl acrylate copolymer | 70 | 1:1 | 10:1 | 90% |
| Comparative example 1 | Polyvinylidene fluoride | 90 | None | | — | — | |
| Comparative example 2 | | | N-vinylpyrrolidone acrylonitrile-isooctyl acrylate copolymer | 70 | 1:1 | 10:1 | 90% |
| Comparative example 3 | | | Acrylonitrile-isooctyl acrylate copolymer | 70 | 1:1 | 10:1 | 90.91% |

| No. | Mass content of structural unit derived from isooctyl acrylate monomer in copolymer B | Monomer containing group shown in formula I in copolymer B | Mass content of structural unit containing group shown in formula I in copolymer B | Bonding force N/m | Capacity retention rate after 500 cycles | Solid content of slurry |
|---|---|---|---|---|---|---|
| Example 1 | 11% | N-vinylpyrrolidone | 1% | 32.3 | 89.50% | 64% |
| Example 2 | 11% | N-vinylpyrrolidone | 1% | 31.4 | 88.90% | 64% |
| Example 3 | 11% | N-vinylpyrrolidone | 1% | 30.6 | 88.40% | 64% |
| Example 4 | 11% | N-vinylpyrrolidone | 1% | 29.8 | 87.50% | 64% |
| Example 5 | 9% | N-vinylpyrrolidone | 1% | 32.1 | 88.70% | 64% |
| Example 6 | 9% | N-vinylpyrrolidone | 1% | 31.5 | 88.20% | 64% |
| Example 7 | 9% | N-vinylpyrrolidone | 1% | 30.2 | 87.50% | 64% |
| Example 8 | 9.9% | N-vinylpyrrolidone | 1% | 32.6 | 89.70% | 64% |
| Example 9 | 9% | N-vinylpyrrolidone | 1% | 33.5 | 89.90% | 64% |
| Example 10 | 8.25% | N-vinylpyrrolidone | 1% | 31.6 | 88% | 64% |
| Example 11 | 7.69% | N-vinylpyrrolidone | 1% | 30.2 | 87% | 64% |
| Example 12 | 9.9% | N-vinylpyrrolidone | 1% | 31.7 | 89.00% | 64% |
| Example 13 | 9% | N-vinylpyrrolidone | 1% | 32.1 | 89.40% | 64% |
| Example 14 | 9.9% | N-vinylpyrrolidone | 1% | 30.9 | 88.70% | 64% |
| Example 15 | 9% | N-vinylpyrrolidone | 1% | 31.3 | 88.50% | 64% |

TABLE 1-continued

Parameters and test results of examples 1-25 and comparative examples 1-3

| | | | | | | |
|---|---|---|---|---|---|---|
| Example 16 | 9.9% | N-vinylpyrrolidone | 1% | 30.1 | 87.80% | 64% |
| Example 17 | 9% | N-vinylpyrrolidone | 1% | 30.5 | 88% | 64% |
| Example 18 | 9.05% | N-vinylpyrrolidone | 0.50% | 29.6 | 88% | 62% |
| Example 19 | 8.95% | N-vinylpyrrolidone | 1.50% | 29.8 | 88% | 62% |
| Example 20 | 8.91% | N-vinylpyrrolidone | 2% | 28.50 | 87% | 61% |
| Example 21 | 9% | N-vinylpyrrolidone | 1% | 28.2 | 86.8% | 61% |
| Example 22 | 9% | N-vinylpyrrolidone | 1% | 27.9 | 86.6% | 61% |
| Example 23 | 9% | N-allyl-2-pyrrolidone | 1% | 28.4 | 86.9% | 61% |
| Example 24 | 9.09% | — | — | 28.80 | 87% | 61% |
| Example 25 | 9% | N-vinylpyrrolidone | 1% | 27 | 86.6% | 61% |
| Comparative example 1 | | | — | 26.5 | 86% | 60% |
| Comparative example 2 | 9% | N-vinylpyrrolidone | 1% | 26.7 | 86.3% | 61% |
| Comparative example 3 | 9.09% | — | — | 26.9 | 86.5% | 59% |

As shown in FIG. 1 and FIG. 2, compared with comparative example 1, in example 1, due to the addition of an acrylonitrile-isooctyl acrylate copolymer modified by a monomer containing a pyrrolidone group, the bonding performance of the binder and the capacity retention rate of the battery are both improved.

According to the results in table 1, it can be seen that examples 1 to 25 all provide a binder composition comprising polyvinylidene fluoride and an acrylonitrile-isooctyl acrylate copolymer, which comprises a structural unit derived from acrylonitrile and a structural unit derived from isooctyl acrylate. Compared with comparative examples 1-3, they all achieve good results, and the bonding performance of the binder and the capacity retention rate of the battery are improved.

The weight average molecular weight of the polyvinylidene fluoride in examples 1-25 is 600,000-900,000, and the weight average molecular weight of the acrylonitrile-isooctyl acrylate copolymer is 400,000-700,000. Compared with comparative examples 1-3, they all achieve good results, and the bonding performance of the binder and the capacity retention rate of the battery are improved.

In examples 1-25, the mass ratio of polyvinylidene fluoride to the acrylonitrile-isooctyl acrylate copolymer in the binder composition is 1:4-4:1. Compared with comparative examples 1-3, they all achieve good results, and the bonding performance of the binder and the capacity retention rate of the battery are improved.

The mass ratio of the structural unit derived from acrylonitrile to the structural unit derived from isooctyl acrylate in the acrylonitrile-isooctyl acrylate copolymer in examples 1-25 is 8:1-12:1, they all achieve good results, and the bonding performance of the binder and the capacity retention rate of the battery are improved. When the mass ratio of the structural unit derived from acrylonitrile to the structural unit derived from isooctyl acrylate in the acrylonitrile-isooctyl acrylate copolymer is 8:1-10:1, the bonding performance of the binder and the capacity retention rate of the battery are further improved.

The acrylonitrile-isooctyl acrylate copolymer in examples 1-23 and 25 is modified by a monomer containing a pyrrolidone group, such that the copolymer comprises a structural units derived from a monomer containing a pyrrolidone group. The acrylonitrile-isooctyl acrylate copolymer modified by the monomer containing a pyrrolidone group has stronger bonding performance of the binder and capacity retention rate of the battery than before modification, and the solid content of the slurry is further improved.

In examples 1-23 and 25, the mass content of the structural unit derived from the monomer containing a pyrrolidone group is 0.1%-2%, based on the total mass of acrylonitrile-isooctyl acrylate copolymer. Within this range, the copolymer improves all of the bonding performance of the binder, the capacity retention rate of the battery and the solid content of the slurry. The mass content of the structural unit derived from the monomer containing a pyrrolidone group in example 1-23 and 25 is either 0.5%-1.5% or 0.5%-1.0%. Within this range, the solid content of the slurry is further improved.

The acrylonitrile-isooctyl acrylate copolymer in examples 1-23 and 25 is modified by the monomer containing a pyrrolidone group, and the mass content of the structural unit derived from acrylonitrile is 80%-95%, based on the total mass of the copolymer. Within this range, the copolymer improves the bonding performance of the binder, the capacity retention rate of the battery and the solid content of the slurry.

The acrylonitrile-isooctyl acrylate copolymer in examples 1-23 and 25 is modified by the monomer containing a pyrrolidone group, and the mass content of the structural unit derived from isooctyl acrylate is 8%-12%, based on the total mass of the copolymer. Within this range, the copolymer improves the bonding performance of the binder, the capacity retention rate of the battery and the solid content of the slurry.

Comparing comparative example 2 with comparative example 3, it can be seen that the solid content in the positive electrode slurry can be increased by modifying the binder with a monomer containing a group shown in formula I. Comparing example 9 with example 24, it can be seen that when the other conditions are the same, the binder modified by a monomer containing a group shown in formula I can increase the solid content in the positive electrode slurry, significantly improve the bonding force between the corresponding current collector and the negative electrode material layer, and significantly improve the capacity retention rate of the battery.

It should be noted that the present application is not limited to the above embodiments. The above embodiments are exemplary only, and any embodiment that has substantially same constitutions as the technical ideas and has the same effects within the scope of the technical solution of the present application falls within the technical scope of the present application. In addition, without departing from the gist of the present application, various modifications that may be conceived by those skilled in the art to the embodiments, and other modes constructed by combining some of the constituent elements of the embodiments also fall within the scope of the present application.

What is claimed is:

1. A binder composition, comprising a fluoropolymer A and a copolymer B, wherein the copolymer B comprises a structural unit derived from a monomer containing a cyano group and a structural unit derived from a monomer containing an ester group, a mass ratio of the structural unit derived from the monomer containing the cyano group to the structural unit derived from the monomer containing the ester group in the copolymer B is 8:1 to 12:1, based on a total mass of the copolymer B, wherein the copolymer B further comprises a structural unit derived from the monomer containing the group shown in formula I, Formula I

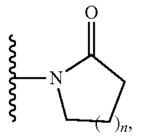

in which, n is selected from 0, 1, 2, or 3, and wherein a mass content of the structural unit derived from the monomer containing a group shown in formula I is 0.1%-1.5%, based on a total mass of the copolymer B, wherein the monomer containing the cyano group is acrylonitrile, the monomer containing the ester group is isooctyl acrylate, the monomer containing the group shown in formula I is N-allyl-2-pyrrolidone.

2. The binder composition according to claim 1, wherein a weight average molecular weight of the fluoropolymer A is 600,000-900,000 g/mol, and a weight average molecular weight of the copolymer B is 400,000-700,000 g/mol.

3. The binder composition according to claim 1, wherein a mass ratio of the fluoropolymer A to the copolymer Bis 1:4-4:1.

4. The binder composition according to claim 1, wherein the fluoropolymer A is selected from one or more of polyvinylidene fluoride, and the copolymers thereof with tetrafluoroethylene, hexafluoropropylene, and trichloroethylene.

5. The binder composition according to claim 1, wherein the monomer containing the cyano group is selected from one or more of acrylonitrile, methacrylonitrile, halogenated acrylonitrile, and methoxyacrylonitrile.

6. The binder composition according to claim 1, wherein the monomer containing the ester group is selected from one or more of methyl acrylate, ethyl acrylate, propyl acrylate, butyl acrylate, isoamyl acrylate, isooctyl acrylate, methyl methacrylate, ethyl methacrylate, hydroxyethyl acrylate, and hydroxypropyl acrylate.

7. The binder composition according to claim 1, wherein the mass ratio of the structural unit derived from the monomer containing the cyano group to the structural unit derived from the monomer containing the ester group in the copolymer B is 8:1-10:1.

8. The binder composition according to claim 7, wherein the monomer containing the group shown in formula I is selected from one or more of N-vinylpyrrolidone and N-allyl-2-pyrrolidone.

9. The binder composition according to claim 1, wherein the mass content of the structural unit derived from the monomer containing the group shown in formula I is 0.5%-1.0%, based on the total mass of the copolymer B.

10. The binder composition of claim 1, wherein, based on a total mass of the copolymer B, a mass content of the structural unit derived from the monomer containing the cyano group is from 80% to 95%, a mass content of the structural unit derived from the monomer containing the ester group is from 8% to 12%, a mass content of the structural unit derived from the monomer containing the group shown in formula I is from 0.5% to 1.5%.

11. The binder composition of claim 1, wherein the fluoropolymer A is polyvinylidene fluoride (PVDF) having a particle size Dv50 of 5 μm to 10 μm, a crystallinity of 35-40%, and a melting point from 160° C. to 170° C.

12. A secondary battery, comprising an electrode assembly and an electrolyte solution, wherein the electrode assembly includes a positive electrode plate, a separator and a negative electrode plate, and the positive electrode plate comprises a positive electrode active material and the binder according to claim 1.

13. The secondary battery according to claim 12, wherein the positive electrode active material is a lithium-containing transition metal oxide, a doped and modified material of the lithium-containing transition metal oxide, a conductive carbon-coated modified material of the lithium-containing transition metal oxide, a conductive metal-coated modified material of the lithium-containing transition metal oxide, or a conductive polymer-coated modified material of the lithium-containing transition metal oxide.

14. A battery module, comprising the secondary battery according to claim 12.

15. A battery pack, comprising the battery module according to claim 14.

16. A power consuming device, comprising the secondary battery according to claim 12.

17. A power consuming device, comprising the battery module according to claim 14.

* * * * *